Figure 1:
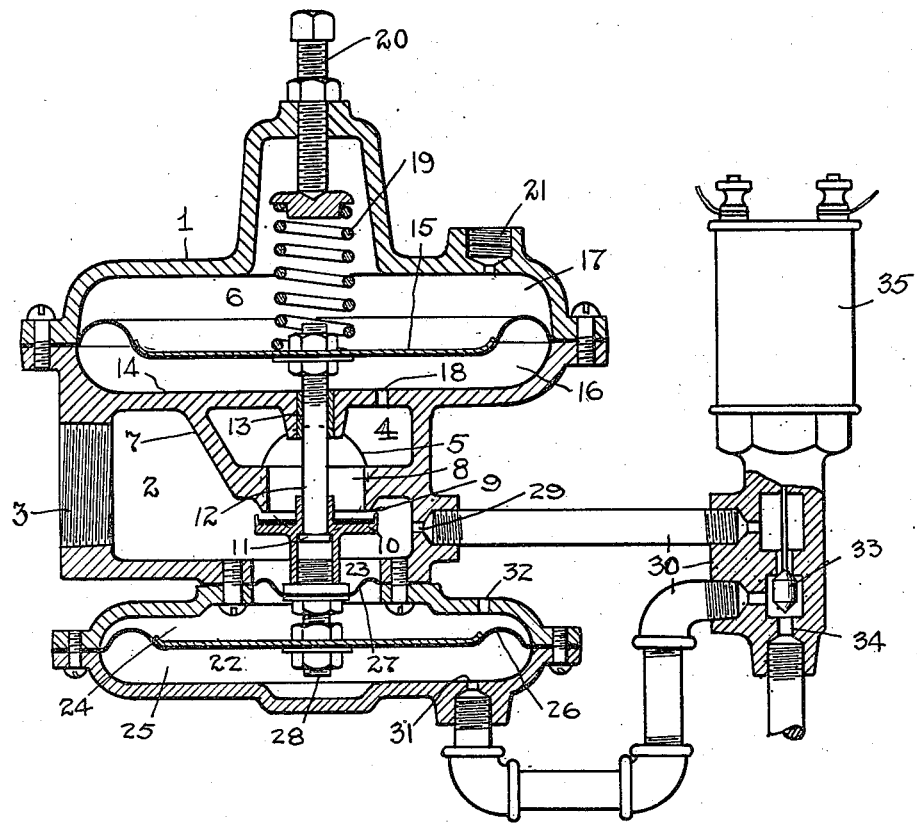

Dec. 31, 1940.   O. FOX   2,226,761
PRESSURE REGULATING, AUTOMATIC CUTOFF VALVE FOR GAS LINES
Filed Sept. 18, 1936   2 Sheets-Sheet 1

INVENTOR.
Otto Fox
BY Fay, Oberlin & Fay
ATTORNEYS.

Dec. 31, 1940.  O. FOX  2,226,761

PRESSURE REGULATING, AUTOMATIC CUTOFF VALVE FOR GAS LINES

Filed Sept. 18, 1936  2 Sheets-Sheet 2

INVENTOR.
Otto Fox
BY Fay, Oberlin & Fay
ATTORNEYS.

Patented Dec. 31, 1940

2,226,761

UNITED STATES PATENT OFFICE 2,226,761

PRESSURE REGULATING, AUTOMATIC CUT-OFF VALVE FOR GAS LINES

Otto Fox, Cleveland, Ohio

Application September 18, 1936, Serial No. 101,497

10 Claims. (Cl. 50—4)

The present invention relates to valves for the control and regulation of gas supplied from service mains to burners, particularly burners used for domestic heating. It is common practice to use gas in such burners at a pressure much lower than that which is usually maintained in the service mains. Also it is highly desirable that the gas supplied to such burners shall maintain a pressure which is substantially constant and does not seriously reflect the variations in pressure which commonly occur in the service mains of a city.

It is an object of the present invention to provide a valve which will supply gas to the burner at a constant predetermined pressure, though the pressure in the supply main may vary widely, and which will function as a cutoff valve closing the supply line when conditions become such that it is desirable for a time to discontinue the use of the burner, and opening same when it is desired to resume use thereof.

It is also an object to secure a cutoff function in the valve which is quick in its action, closing the supply line practically instantaneously, as with a snap action. This is important in a cutoff valve as otherwise the gas will flash back in the burner, during the opening and closing operations.

It is also an object to provide positive control means for the shut-off valve, that is, means which operate to open the valve and supply gas to the burner. Then when such means fail to function by reason of current failure, or from any other cause, the gas supply to the burner is shut off until the failure is corrected.

It is a further object to provide means using the pressure of the gas as it comes from the service mains as the force operative to close a shut-off valve responsive to changed conditions at a distant point of control.

And it is a still further object to provide means which operate a shut-off valve responsive to the expansion of a unit heated by an electric current transmitted when certain conditions exist at a distant point of gas user.

The said several objects have been attained in my herein described invention which generally speaking uses a single valve simultaneously under two controls. A valve stem on one side of said valve is manipulated by devices which so restrict the valve opening that the gas on the outlet side of the valve is maintained at a predetermined adjustable pressure, and a valve stem on the opposite side of the valve is manipulated by devices which snap said valve shut when conditions resulting from the use of the burner become such that discontinuance of gas supply is desired.

Two embodiments of my said invention are described. That shown in Fig. 1 discloses a pressure regulating valve of a usual type but with an auxiliary stem for the valve. The gas received under pressure from supply mains is by-passed to operate a diaphragm, which is operatively connected to said auxiliary stem, and which through said stem closes the valve of the pressure regulating device. The said by-pass contains a valve with means to operate same responsive to conditions at a distant place of control. For instance the valve may be operated responsive to the temperature in a room, or to the heat in a hot water tank, or to the pressure in a boiler, or to a timing device. Many such uses will occur to those skilled in the art. The means shown for operating the valve in the by-pass consists of a solenoid through which a current is passed until shut off responsive to conditions at a desired place of control, but other means of thus opening and closing the by-pass valve may be used with equal success.

Figure 2:
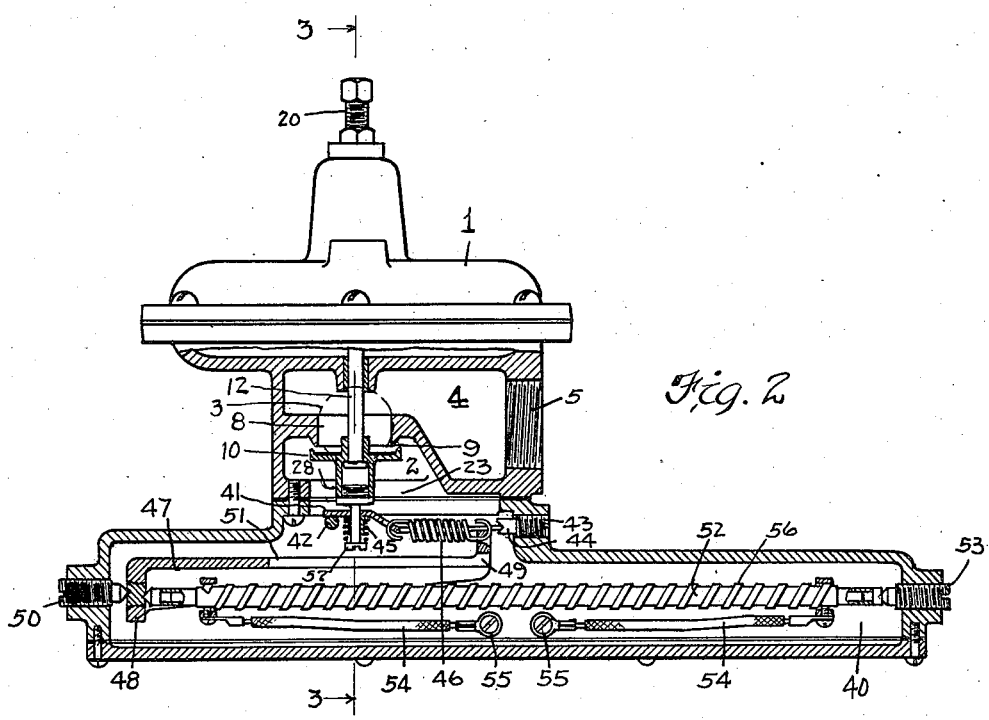
Figure 3:
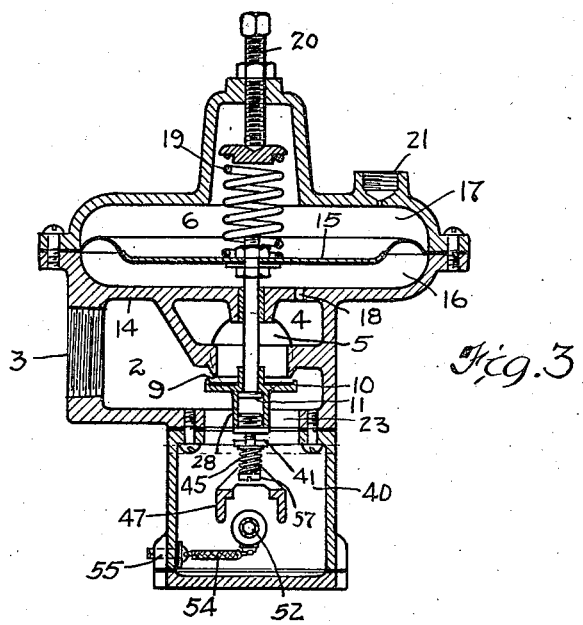

The embodiment shown in Figs. 2 and 3 shows a similar regulating valve with an auxiliary stem, but the operative means shown for operating said valve as a cutoff valve make use of the heating effect of an electric current passed through a coil of wire wound on a metal bar. Such current is passed through the heating coil responsive to conditions at the desired place of control. The heat of the coil causes the bar to expand and the movement of the end of the bar as it expands is transmitted through levers which open the regulating valve as will be explained in detail.

To the accomplishment of the foregoing and related ends, said invention, then, consists of the means hereinafter fully described and particularly pointed out in the claims, the annexed drawings and the following description setting forth in detail preferred devices involving the use of my invention, such disclosed devices, however, not constituting limitations, but merely setting forth preferred way in which the principle of my invention may be used.

In said annexed drawings:

Fig. 1 is a cross-sectional view of one embodiment of my invention; Fig. 2 is a cross-sectional view of another embodiment of my invention; and Fig. 3 is a cross-sectional view of the embodiment shown in Fig. 2 taken on the line 3—3 therein.

Referring to the drawings, 1 designates the casing of a pressure regulating valve of a type used in the control of the burner pressure of gas furnished from a supply main; within said casing is an intake passage 2 to which gas is admitted through the opening 3, an outlet passage 4 from which gas is discharged to the burners, not shown, through the opening 5, and a chamber 6 containing means for regulating pressure of gas as it is discharged from the valve. The intake passage 2 and the outlet passage 4 are separated by an intermediate partition 7 provided with a valve port 8 surrounded by a valve seat 9. A valve 10 is held in operative relation to said valve seat 9 by the head 11 of the valve stem 12 upon which it is slidably mounted. The said valve stem 12 extends through the port 8 and through a bore 13 in the partition 14 which separates the chamber 6 from passages 2 and 4, and is affixed to a diaphragm 15 which is mounted to divide the chamber 6 into a lower section 16 and an upper section 17. Gas from the outlet passage 4 is admitted to the said lower section 16 by the orifice 18, subjecting the lower side of the diaphragm 15 to the pressure of the outgoing gas.

Mounted in the upper section 17 of chamber 6 is a spiral spring 19 which presses downward upon the diaphragm with a pressure which may be regulated by the adjustable screw 20. An orifice 21 in the wall of upper section 17 of chamber 6 subjects the upper side of the diaphragm to atmospheric pressure.

It will be understood that the described apparatus will operate to discharge gas from the opening 5 at a constant pressure irrespective of the pressure at which it is admitted at opening 3. This constant pressure will be determined by the tension of the spring 19 acting through the diaphragm 15 which is subjected on its lower side to the pressure of the out-flowing gas.

In the bottom wall of the inlet passage 2, directly beneath the valve 10, is an opening 23 communicating with a chamber 22, which chamber is divided into upper portion 24 and lower portion 25 by a diaphragm 26. Across the opening 23 is mounted a diaphragm 27, through the center of which an auxiliary valve stem 28 is fixedly mounted. The upper end of the auxiliary valve stem 28 is affixed to the lower face of the valve 10 and the lower end to the diaphragm 26.

Through an orifice 29 in the wall of the inlet passage 2, gas at supply main pressure is conducted through a valved by-pass, generally indicated at 30, to an orifice 31 in the wall of the lower portion 25 of the chamber 22. In the wall of the upper portion 24 of the chamber 22 is an open orifice 32 through which the upper face of the diaphragm 26 is constantly subjected to atmospheric pressure.

The by-pass 30 includes a valve 33 which operates to open and close the by-pass responsive to changes in conditions at a distant place of control. As shown, the valve in the by-pass is operated by a solenoid 35 responsive to electrical impulse sent from said place of control by means well understood in the art.

In operation, when the regulating valve 1 is furnishing gas at a desired pressure to the place of use, the valve 33 will close the by-pass being lifted and held in the position shown by an electrical current passing through the solenoid 35. Should the temperature in a room heated by the burning of said gas reach a desired temperature, or should a desired pressure be reached in a boiler heated by said gas, the electrical current will be shut off by means well understood and the valve 33 will drop from its seat and open the by-pass. The by-pass being open, gas at the pressure of the supply mains will flow to the under side of the diaphragm 26 and lift it, snapping shut the valve 10 which is connected to the diaphragm 26 by the auxiliary stem 28.

When the valve 10 has been shut a sufficient length of time to permit the temperature of the room to drop, or the pressure in the boiler to diminish, the current will again flow through the solenoid which will lift the valve 33 and close the by-pass. The valve 33 in closing the by-pass 30 opens a bleeder outlet 34 through which the gas trapped in the lower portion 25 of the chamber 22 will escape, relieving the pressure below the diaphragm 26.

The diaphragm 27 across the opening 23 not only separates the inlet passage 2 from the upper section 24 of chamber 22, but also assists in opening the valve 10 against the pressure of the inflowing gas from the supply main. The said pressure exerted against the diaphragm 27 to which the auxiliary stem 28 is affixed will act against the effect of the same pressure against the lower face of the valve 10. By properly proportioning the size of the said diaphragm 27 relative to the size of the valve 10, the balance between the pressure exerted thereon by the incoming gas may be so adjusted that the weight of the valve 10 and the auxiliary valve stem 28 will be sufficient to open the valve 10 when it is relieved from the upward pressure of diaphragm 26 as a result closing the by-pass 30 and opening the bleeder 34.

An alternative operating means to secure the cutoff function of the valve 10 through manipulation of its auxiliary stem 28 is shown in Figs. 2 and 3. Below the opening 23 in the lower wall of the intake passage 2, of the pressure regulating valve 1, is mounted an elongated closed chamber 40, communicating with said passage 2 through said opening 23 by means of a restricted throat. Mounted across the throat of chamber 40, below the opening 23 in the wall of intake passage 2, is a forked lever 41, the forked ends of which are fulcrumed in slots in plugs 44 slidably mounted in bores in the walls of the throat opening out of chamber 40. These plugs 44 may be adjusted by screws 43 threaded in the outer ends of said bores. The free end of the lever 41 rests against the stop 42. Through said free end passes a headed pin 57 adjustably threaded into the lower end of the auxiliary stem 28. A spiral spring 45 is mounted on said pin 57 between the head thereof and the overlying lever 41. The position of parts shown and described is that assumed when the valve is functioning as a pressure regulator passing gas at a constant pressure to a burner.

Below the lever 41 is a lever 47 with terminal arms 48 and 49 oppositely extended at right angles. The outside face of arm 48 is fulcrumed on the point of an adjustable screw 50 set in the end wall of the chamber 40, against which screw point it is held by pressure of a metal rod 52 which is mounted between the inner face of the lever arm 48 and the point of an adjustable screw 53 set in the opposite end wall of chamber 40. The engagement of said rod 52 with the inner face of the arm 48 is by means of a pointed end on said rod which bears against said face of said arm 48 intermediate the end of said arm and the bearing point of the screw 50 on the opposite face of the arm.

The arm 49 at the free end of the lever 47 extends upwardly and is terminally engaged by one end of a spiral tension spring 46 which is positioned between the legs of the forked lever 41 with the opposite end of said spring in engagement with said lever adjacent the juncture of said legs. By means of the screws 43 the plugs 44 are advanced until the tension on the spring 46 is such that the end of arm 49 of lever 47 is lifted against the pressure of the unheated rod 52 bearing against the other arm 48 of said lever 47, and at the same time the said tension on said spring 46 will lift the lever 41 about its fulcrum in the slotted plugs 44 until the free end of said lever 41 will engage the lower end of the auxiliary stem 28 of the valve 10 and thrust it upward with a force sufficient to close said valve 10, making the apparatus inoperative as a regulator of gas pressure, but operative as a shut-off valve.

Spirally wound about the metal rod 52 and electrically insulated therefrom is a wire 56 of a metal which is readily heated by the passage of a current of electricity therethrough. Connectors 54 connect the ends of said wire 56 respectively with binding posts 55 set in the walls of the chamber 40.

In operation, a source of electro-motive force will cause a current to flow from a place of control to the binding posts 55 and through the wire 56 heating same. Under the heat of said wire 56 the rod 52 will expand and press against its bearing in arm 48 of lever 47 thereby pulling downward the opposite arm 49. The positions of the connection between the spring 46 and the arm 49 and the connection between the spring 46 and the lever 41 are such relative to the position of said lever 41 and its fulcrum in the slotted plugs 44 that downward movement of the arm 49 caused by the expansion of rod 52 against the arm 48 will snap the free end of said lever 41 downward against the stop 42 thereby freeing the auxiliary stem of the valve 10. Such downward movement of the lever 41 will through the spring 45 exert downward pressure upon the headed pin 57 mounted in the lower end of the auxiliary stem of valve 10 and pull the stem and valve downward opening the port 8 and permitting the apparatus to function as a regulator, controlling the pressure at which gas will flow to the burner. This is the position of the apparatus as shown in Figs. 2 and 3.

Responsive to change in conditions at a desired place of control, the current flowing to the wire 56 is cut off by means well understood in the art. Such conditions so changing may be the temperature of a room which is being heated by the burner, or the temperature or pressure of a boiler, or any of a variety of conditions which it may be desired to regulate through control of gas flow to a burner. When the current flow to the wire 56 is cut off the wire cools and the rod 52 shortens. Being relieved of the pressure of expansion in rod 52 the lever 47 will be raised by the tension of spring 46. When the connection between the arm 49 of lever 47 has raised sufficiently, the line of pull exerted by the spring 46 on the lever 41 will be raised and the said lever 41 will be jerked upward into engagement with the auxiliary stem 28 of valve 10 whereby the said valve will be snapped shut.

When further change of condition restores current flow in the wire 56 thereby heating rod 52 the expansion of said rod will pull downward the end of arm 49. As the point of connection between said arm 49 and the spring 46 lowers the line of pull of the latter relative to the lever 41, and its fulcrums in the slotted plugs 44, will be lowered and the said lever will be jerked downward, releasing the valve 10 which will be unseated by the force of the downwardly moving lever 41 transmitted through the spring 45 to the head of the pin 57 adjustably threaded into the end of auxiliary stem 28 of valve 10.

It will be noted that the tension of the spring 45 may be made such by adjustment of the pin 57, that it will maintain the valve 10 in engagement with the head of main stem 12 upon which valve 10 is slidably mounted. Also it will be noted that when so tensioned, spring 45 will cooperatively act with spring 19 in regulating the pressure of outgoing gases through control of the position of the valve 10 relative to the valve seat 9 and port 8.

Other modes of applying the principles of my invention may be employed instead of those explained, change being made as regards the mechanism herein disclosed, provided the means stated by any of the following claims or the equivalent of such stated means be employed.

I therefore particularly point out and distinctly claim as my invention:

1. In a dual control device for supplying fluid fuel under pressure to a burner, having in combination a casing enclosing inlet and outlet chambers for passage of such fuel, a valve controlling the communication of said chambers, and a diaphragm subject to the fluid pressure in the outlet chamber and operatively connected to said valve to maintain said pressure in the outlet chamber constant; the improvement comprising a second diaphragm subject to the fluid pressure in the inlet chamber and operatively connected to said valve to maintain same closed under the fluid pressure of the inlet chamber, a passage communicating with said inlet chamber and subjecting said second diaphragm to the fluid pressure therein, a valve controlling movement of fluid through said passage, and means operating said last mentioned valve responsive to change of conditions at a station of outside control.

2. In a dual control device for supplying fluid fuel under pressure to a burner, having in combination a casing enclosing inlet and outlet chambers for passage of such fuel, a valve controlling the communication of said chambers, diaphragm means regulating said valve responsive to the pressure of fuel in said outlet chamber whereby fuel flow through said valve is so modified that pressure in said outlet chamber is maintained at a predetermined value; the improvement comprising a second diaphragm means, normally operative to move said valve to an open position and operative when under pressure of fuel to move said valve to a closed position, valved means operatively subjecting said second diaphragm to the pressure of fuel supplied to said inlet chamber, and means controlling said valved means responsive to change of conditions at a station of outside control.

3. In combination in a dual control device for controlling fuel supply to a burner, a casing having an inlet passage and an outlet passage separated by an apertured division wall; a valve member operative to control communication between said passages through such aperture; a stem upon which said member is slidably mounted and by which it is suspended below such aperture; means operative through said stem to draw said member toward such aperture responsive to increase of fluid pressure in said outlet passage; and means operative to snap said member into closed relation with such aperture responsive to an intermittent condition at a station of outside control, said last-named means being adapted to abruptly release said member when such condition ceases to be effective.

4. In a device operative to control passage of a fluid therethrough and to regulate the pressure of out-put fluid therefrom, in combination, a valve seat and co-operating valve in the fluid passage through such device, said valve being maintained normally in open position; a valve stem slidably mounted through said valve; an element on said valve stem adapted to limit movement of said valve away from said valve seat; a diaphragm and means whereby it is operative, through said valve stem and responsive to changes in pressure in output fluid, to regulate movement of said valve away from said valve seat; a second diaphragm operative to force said valve to a closed position on said seat; a member operatively transmitting movement of second diaphragm to said valve; and a valved passage adapted to operatively subject said second diaphragm to in-let fluid under pressure and alternately to exhaust fluid therefrom.

5. A device, as described, operative to supply gas intermittently to a burner, at a predetermined pressure unaffected by variations in the pressure in the gas as received, responsive to requirements as determined at an outside station of control, comprising a valved pressure regulator of the conventional diaphragm type; a shut-off mechanism including a diaphragm, one side of which is connected to the head of the valve in said regulator and which is operative to close such valve responsive to pressure of input gas; a by-pass operative to subject the other side of said shut-off diaphragm to the pressure of input gas; a valve in said by-pass; and means operative to control said valve from a distant station.

6. A device, as described, operative to supply gas intermittently to a burner, at a predetermined pressure unaffected by variations in the pressure in the gas as received, responsive to requirements as determined at an outside station of control, comprising a valved pressure regulator of the conventional diaphragm type including a lost motion connection between the valve head of said regulator and the stem connecting such valve head with the diaphragm of said regulator; a shut-off mechanism including a diaphragm, one side of which is connected to the head of the valve in said regulator and which is operative to close such valve responsive to pressure of input gas; a by-pass operative to subject the other side of said shut-off diaphragm to the pressure of input gas; a valve in said by-pass; and means operative to control said valve from a distant station.

7. In combination in a dual control device for controlling fuel supply to a gas burner, a casing having an inlet passage and an outlet passage; a division wall having an aperture therein between said passages; a valve seat about such aperture; a valve member operative to control communication between said passages through such aperture; a stem upon which said valve member is slidably mounted and by which it is supported co-axially with said valve seat; diaphragm means operative to shift said stem and draw said valve member closer toward said valve seat responsive to increase of pressure in said outlet passage; means operative to urge said valve member away from said valve seat; and means operative to snap said valve member into closed relation with said valve seat and alternatively to snap said member into open relation therewith, said last named means comprising a lever having one end resting on a fulcrum and having the other end in position to engage said valve member when actuated, a second lever, a spring connecting one arm of said second lever with a point intermediate the ends of said first lever, the relation of said first lever and said spring being such that said first lever is urged against its fulcrum by said spring and is tilted about said fulcrum into and out of engagement with said valve member responsive to movement of that arm of said second lever to which said spring is attached, and means operative to shift the free end of said second lever responsive to intermittent currents of electricity transmitted from a distant station.

8. Apparatus for the control of gas supply from a source furnishing gas at varying pressures, comprising in combination a device capable of delivering an output of gas at a predetermined pressure, substantially unaffected by variations in the pressure at which gas is supplied thereto, said device including inlet and outlet gas passages and a valve seat circumscribing an opening therebetween, a valve in operative relation to said valve seat, and mechanism, actuated by the pressure of output gas, capable of moving said valve toward, or away from, said valve seat as the input pressure increases or decreases; and a device operatively connected to said valve and capable of moving same into engagement with said valve seat and moving same away from said valve seat, said auxiliary device including a chamber having a common opening in the wall of said passage for input gas; a lever beneath said opening having one end bearing on a fulcrum and the other end in operative relation with said valve, closing same; a second lever, with arms, normally disposed, extending oppositely from each end thereof with one of said arms bearing on a fulcrum intermediate its ends and the other of said arms supported by a tension spring connecting it to a mediate point in said first lever; and a rod adapted to expand under the influence of heat and having a free end bearing against the fulcrumed arm of said arm bearing lever, whereby under expansion said rod moves said lever causing the free end thereof to move downward sufficiently to lower the line of pull in the attached tension spring causing said first named lever to snap out of operative relation with said valve permitting it to open; and means operative to heat said rod by a current of electricity transmitted responsive to a change of conditions at a remote point of control.

9. In a control device for gas service lines through which gas is supplied from a source furnishing gas at varying pressures, a body having input and output passages; a valve seat circumscribing an opening between said passages; a valve supported in operative relation to said valve seat; a stem slidably mounted on said valve, and operative to draw said valve toward said valve seat and to permit limited movement of said valve away from said valve seat; a device on the output side of said valve operative responsive to the increase of pressure in outlet gas to reciprocate said stem drawing said valve toward said seat; means operative to close and open said valve with a snap action, said means including a lever mounted with a free end in operative relation with said valve, a tension spring so connected to said lever and to a second lever that the pull thereof will shift the free end of first named lever toward and away from said valve as said second lever is shifted; and means operative to shift said second lever responsive to change of conditions at a remote place of control.

10. In a control device for gas service lines through which gas is supplied from a source furnishing gas at varying pressures, a body having input and output passages; a valve seat circumscribing an opening between said passages; a valve supported in operative relation to said valve seat; a stem slidably mounted on said valve, and operative to draw said valve toward said valve seat and to permit limited movement of said valve away from said valve seat; a device on the output side of said valve operative responsive to the increase of pressure in outlet gas to reciprocate said stem drawing said valve toward said seat; means operative to close and open said valve with a snap action, said means including a lever mounted with a free end in operative relation with said valve, a tension spring so connected to said lever and to a second lever that the pull thereof will shift the free end of first named lever toward and away from said valve as said second lever is shifted; and means operative to shift said second lever responsive to change of conditions at a remote place of control, said means including a metallic rod mounted with one end bearing against an arm of said second lever, and an electric heating element operative to heat said rod.

OTTO FOX.